US011206259B2

(12) United States Patent
Storm et al.

(10) Patent No.: US 11,206,259 B2
(45) **Date of Patent: *Dec. 21, 2021**

(54) AUTHENTICATION BY TRANSMITTING INFORMATION THROUGH MAGNETIC FIELDS

(71) Applicant: Advanced New Technologies Co., Ltd., George Town (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,260

(22) Filed: May 12, 2020

(65) Prior Publication Data

US 2020/0403989 A1 Dec. 24, 2020

Related U.S. Application Data

(63) Continuation of application No. 16/447,762, filed on Jun. 20, 2019, now Pat. No. 10,681,044.

(51) Int. Cl.
*H01L 29/06* (2006.01)
*H04L 29/06* (2006.01)
(Continued)

(52) U.S. Cl.
CPC .......... *H04L 63/0861* (2013.01); *G06F 21/32* (2013.01); *G06F 21/43* (2013.01); *H04L 63/0853* (2013.01)

(58) Field of Classification Search
CPC ........................ H04L 63/0861; H04L 63/0853
(Continued)

(56) References Cited

U.S. PATENT DOCUMENTS 10,050,677 B1 8/2018 Thoen
10,182,328 B1 1/2019 Maibach et al.
(Continued)

OTHER PUBLICATIONS

IP.Com, "Automatic Setup / Configuration for New Devices", IP.com No. IPCOM000253776D IP.com Electronic Publication Date: May 3, 2018 (Year: 2018).*
(Continued)

*Primary Examiner* — Khalil Naghdali
(74) *Attorney, Agent, or Firm* — Fish & Richardson P.C.

(57) ABSTRACT

The technology described in this document can be embodied in a computer-implemented method that includes receiving, at one or more servers from a first computing device, (i) first identification information identifying the first computing device or an application executing on the first computing device, and (ii) second identification information identifying a second computing device. The second identification information is obtained by the first computing device by detecting changes to one or more parameters of a magnetic field generated by the second computing device. The method also includes determining, by the server based on the first information, identity information of a user associated with the first computing device, and transmitting, from the one or more servers to the second computing device, the identity information, such that the identity information is usable by the second computing device to verify an access attempt by the user.

22 Claims, 6 Drawing Sheets

300

Receive, from a first computing device, (i) first identification information identifying the first computing device or an application executing on the first computing device, and (ii) second identification information identifying a second computing device, wherein the second identification information is obtained by the first computing device by detecting changes to one or more parameters of a magnetic field generated by the second computing device

305

Determine, based on the first information, identity information of a user associated with the first computing device

310

Transmit, to the second computing device, the identity information, such that the identity information is usable by the second computing device to verify an access attempt by the user

315

(51) Int. Cl.
*G06F 21/43* (2013.01)
*G06F 21/32* (2013.01)

(58) Field of Classification Search
USPC .............................................................. 726/7
See application file for complete search history.

(56) References Cited

U.S. PATENT DOCUMENTS 10,218,695 B1 * 2/2019 Jain ....................... H04L 63/102
10,467,398 B1 * 11/2019 Derakhshani ...... G06K 9/00288
2002/0059550 A1 5/2002 Kondo et al.
2005/0261972 A1 11/2005 Black
2007/0216405 A1 9/2007 Takeuchi et al.
2008/0272892 A1 11/2008 O'Byrne et al.
2009/0253984 A1 10/2009 Yui et al.
2010/0320266 A1 12/2010 White
2012/0284427 A1 * 11/2012 Dods ..................... H04W 88/00 710/3
2013/0072115 A1 3/2013 Dobyns
2013/0079037 A1 3/2013 Dobyns
2013/0148828 A1 6/2013 Fort et al.
2013/0221094 A1 8/2013 Smith et al.
2014/0184505 A1 * 7/2014 Fullerton ............ G06F 3/03544 345/158
2015/0207232 A1 7/2015 Dolgin
2015/0348044 A1 12/2015 Smith
2015/0373537 A1 12/2015 Toksvig et al.
2016/0066185 A1 3/2016 Dobyns et al.
2016/0071089 A1 3/2016 Boivie
2016/0103200 A1 4/2016 LoPresti
2016/0142856 A1 5/2016 Worrall et al.
2016/0191120 A1 6/2016 Dobyns et al.
2016/0253651 A1 9/2016 Park et al.
2016/0260075 A1 9/2016 deKozan et al.
2016/0278012 A1 9/2016 Kawahara et al.
2016/0294426 A1 10/2016 Pahuja
2016/0321633 A1 11/2016 Chandrasekaran et al.
2016/0379205 A1 12/2016 Margadoudakis
2017/0011745 A1 1/2017 Navaratnam
2017/0024742 A1 1/2017 Khan et al.
2017/0178103 A1 6/2017 Peri et al.
2017/0180009 A1 6/2017 McManus et al.
2017/0308884 A1 10/2017 Zou et al.
2018/0005220 A1 1/2018 Laracey et al.
2018/0012228 A1 1/2018 Milevski et al.
2018/0040954 A1 2/2018 Richardson et al.
2018/0082220 A1 3/2018 Bombacino et al.
2018/0097275 A1 4/2018 Lee et al.
2018/0522020 4/2018 Yang et al.
2018/0121912 A1 5/2018 Morales
2018/0204204 A1 7/2018 Giraudo et al.
2018/0241577 A1 8/2018 D'Souza et al.
2018/0349889 A1 12/2018 Ghosh et al.
2019/0213311 A1 * 7/2019 Tussy ...................... G06F 21/32
2019/0222570 A1 * 7/2019 Krishan .................. G06F 21/35
2020/0005263 A1 1/2020 Arora et al.
2021/0028850 A1 1/2021 Elliott et al.
2021/0037281 A1 2/2021 Kian et al.

OTHER PUBLICATIONS

IP.Com, "Method and Apparatus for Mobile Identity Authentication", IP.com No. IPCOM000194545D IP.com Electronic Publication Date: Mar. 29, 2010 (Year: 2010).*
U.S. Appl. No. 15/930,269, filed May 12, 2020, Gregory Lee Storm.
U.S. Appl. No. 16/447,802, filed Jun. 20, 2019, Gregory Lee Storm.
U.S. Appl. No. 16/795,224, filed Feb. 19, 2020, Gregory Lee Storm.

* cited by examiner

Figure 3:
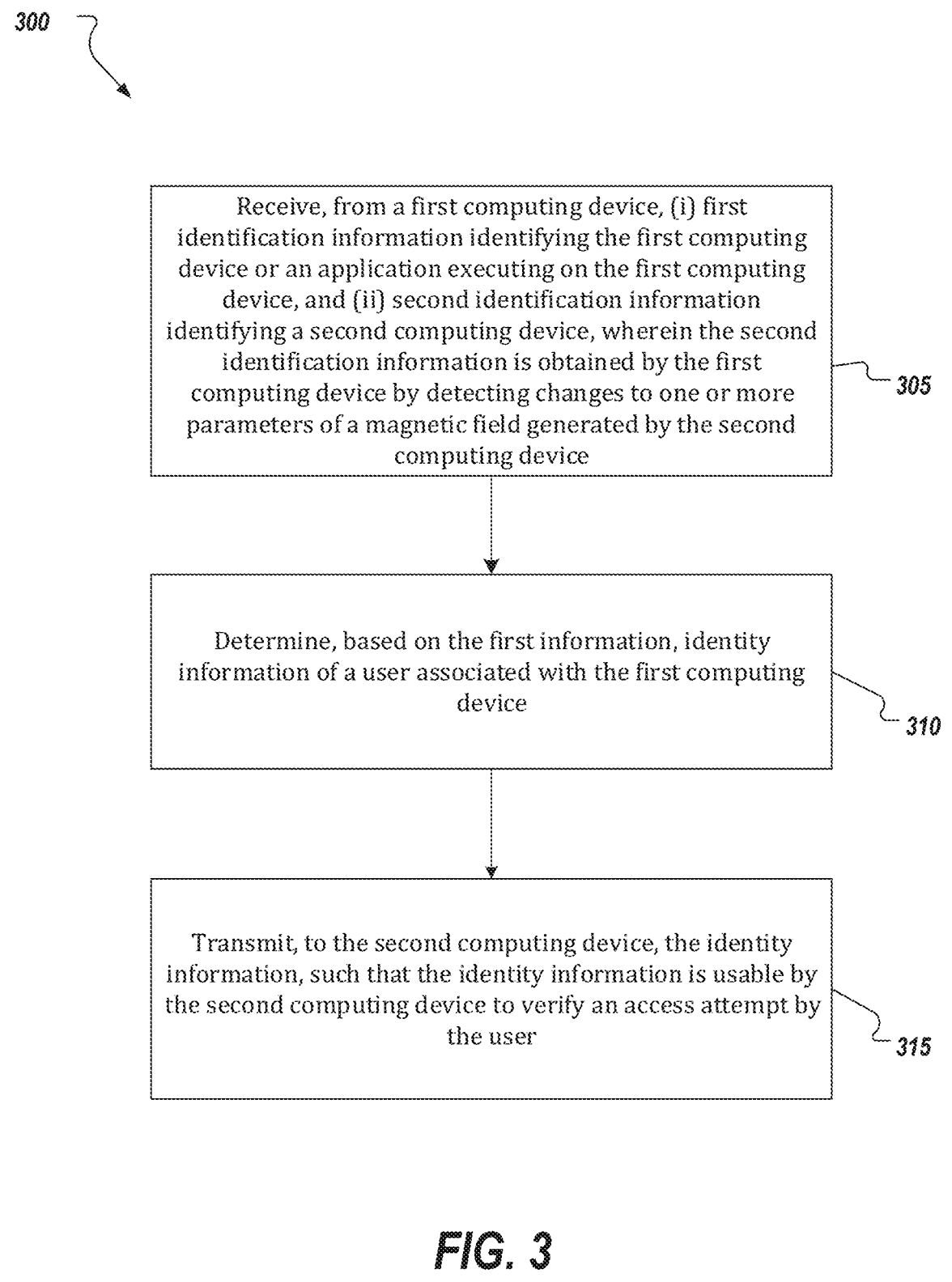

300

Receive, from a first computing device, (i) first identification information identifying the first computing device or an application executing on the first computing device, and (ii) second identification information identifying a second computing device, wherein the second identification information is obtained by the first computing device by detecting changes to one or more parameters of a magnetic field generated by the second computing device

305

Determine, based on the first information, identity information of a user associated with the first computing device

310

Transmit, to the second computing device, the identity information, such that the identity information is usable by the second computing device to verify an access attempt by the user

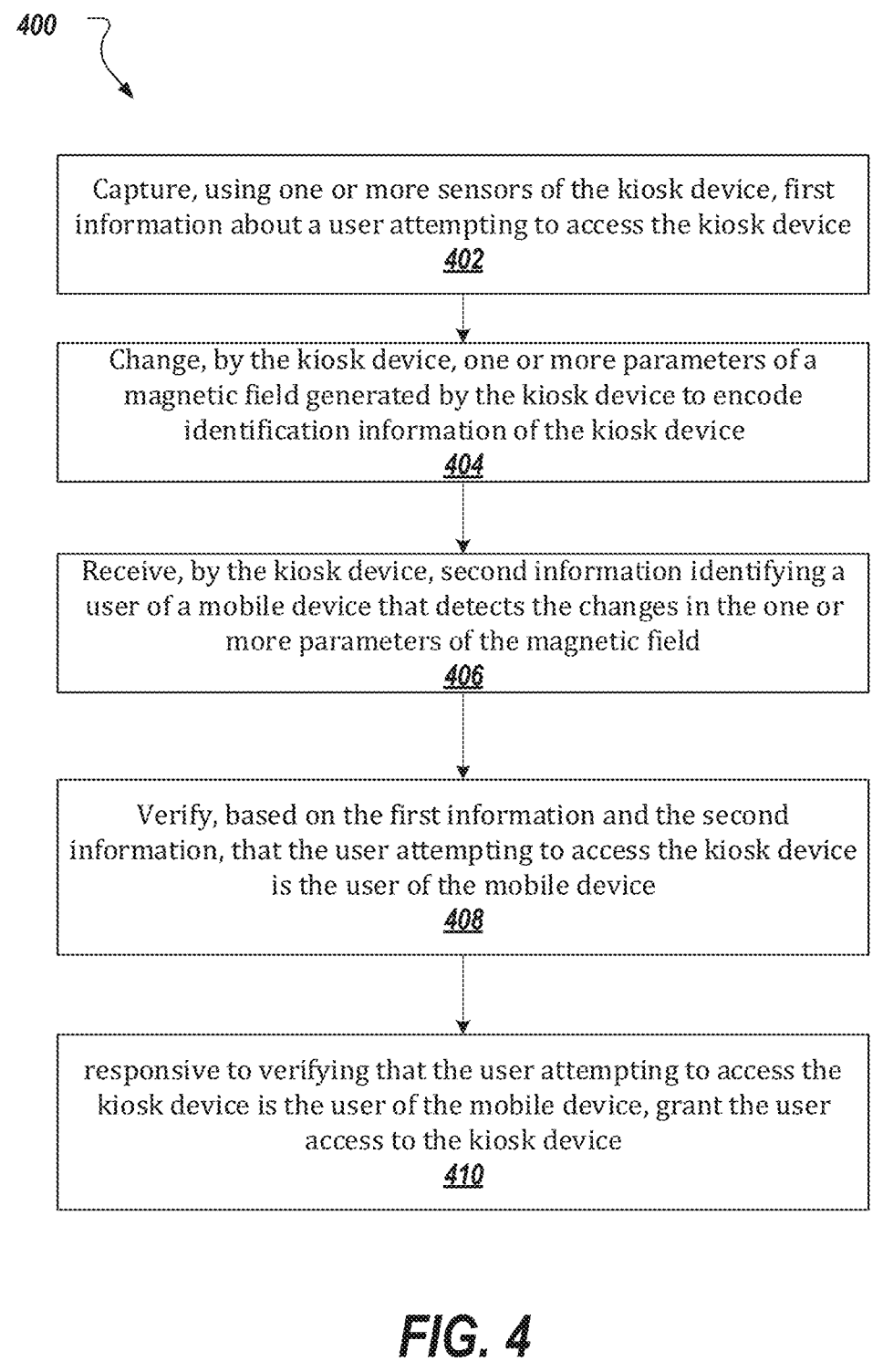

Capture, using one or more sensors of the kiosk device, first information about a user attempting to access the kiosk device
402

Change, by the kiosk device, one or more parameters of a magnetic field generated by the kiosk device to encode identification information of the kiosk device
404

Receive, by the kiosk device, second information identifying a user of a mobile device that detects the changes in the one or more parameters of the magnetic field
406

Verify, based on the first information and the second information, that the user attempting to access the kiosk device is the user of the mobile device
408 responsive to verifying that the user attempting to access the kiosk device is the user of the mobile device, grant the user access to the kiosk device
410

FIG. 4

AUTHENTICATION BY TRANSMITTING INFORMATION THROUGH MAGNETIC FIELDS

CROSS-REFERENCE TO RELATED APPLICATION

This application is a continuation of U.S. application Ser. No. 16/447,762, filed on Jun. 20, 2019, and the application is hereby incorporated by reference in its entirety.

TECHNICAL FIELD

This disclosure relates to biometric authentication systems.

BACKGROUND

Systems incorporating a biometric identification technology such as face recognition or iris recognition capture information from a user and processes such information to authenticate the user using the biometric identification technology.

SUMMARY

In one aspect, this document features a computer-implemented method that includes receiving, at one or more servers from a first computing device, (i) first identification information identifying the first computing device or an application executing on the first computing device, and (ii) second identification information identifying a second computing device. The second identification information is obtained by the first computing device by detecting changes to one or more parameters of a magnetic field generated by the second computing device. The method also includes determining, by the server based on the first information, identity information of a user associated with the first computing device, and transmitting, from the one or more servers to the second computing device, the identity information, such that the identity information is usable by the second computing device to verify an access attempt by the user.

Implementations of the above aspect can include one or more of the following features. The one or more parameters of the magnetic field can include at least one of a strength of the magnetic field and a direction of the magnetic field. The strength of the magnetic field can be measured as a magnetic flux density. Detecting the changes to the one or more parameters can include detecting a frequency at which the one or more parameters change. The magnetic field can be generated by changing one or more parameters of a current flowing through a conductor around a magnetic core disposed at the second computing device. The first computing device can include a mobile computing device. The mobile computing device can include a receiver including a magnetic sensor configured to detect the changes to the one or more parameters and decoding software configured to decode the change to the one or more parameters. The magnetic sensor can include a magnetometer. The first identification information can include a phone number of the first computing device, and the second identification information can include a kiosk identifier. The changes to the one or more parameters of the magnetic field can include a magnetic signal including binary data encoded using a modulation technique, the binary data including the second identification information. The modulation technique can include one or more of a Frequency-shift keying (FSK) modulation, a Phase-shift keying (PSK) modulation, and an Amplitude-shift keying (ASK) modulation. The binary data can be temporally encoded using indicators of transmitted signal bursts, the signal bursts generated using a signal compression method.

In another aspect, this document features a method of verifying a user at a kiosk device. The method includes capturing, using one or more sensors of the kiosk device, first information about a user attempting to access the kiosk device. The method also includes changing, by the kiosk device, one or more parameters of a magnetic field generated by the kiosk device to encode identification information of the kiosk device. The method also includes receiving, from one or more servers by the kiosk device, second information identifying a user of a mobile device that detects the changes in the one or more parameters of the magnetic field. The method also includes verifying, by the kiosk device based on the first information and the second information, that the user attempting to access the kiosk device is the user of the mobile device, and, responsive to verifying that the user attempting to access the kiosk device is the user of the mobile device, granting the user access to the kiosk device.

Implementations of the above aspect can include one or more of the following features. Changing the one or more parameters of the magnetic field can include changing, by an electric circuit electrically coupled to a conductor disposed around a magnetic core of the kiosk device, one or more parameters of a current flowing through the conductor. Changing the one or more parameters of the magnetic field can include changing at least one of a strength of the magnetic field and a direction of the magnetic field. Changing the one or more parameters of the magnetic field can include generating a magnetic signal including binary data encoded using a modulation technique, the binary data including the second identification information. The binary data can be temporally encoded using indicators of transmitted signal bursts, the signal bursts generated using a signal compression method. Generating a magnetic signal can include generating a near-field magnetic induction (NFMI) signal. The one or more sensors of the kiosk device can include one or more image sensors or biometric sensors, and capturing the first information about the user includes capturing an image or other biometric information of the user. Receiving the second information from the one or more servers can include receiving an image of the user captured during an enrollment process.

BRIEF DESCRIPTION OF THE DRAWINGS

FIG. 3 is a flowchart of an example process for verifying an access attempt by a user.

FIG. 4 is a flowchart of an example process for verifying a user at a kiosk device.

Figure 1A:
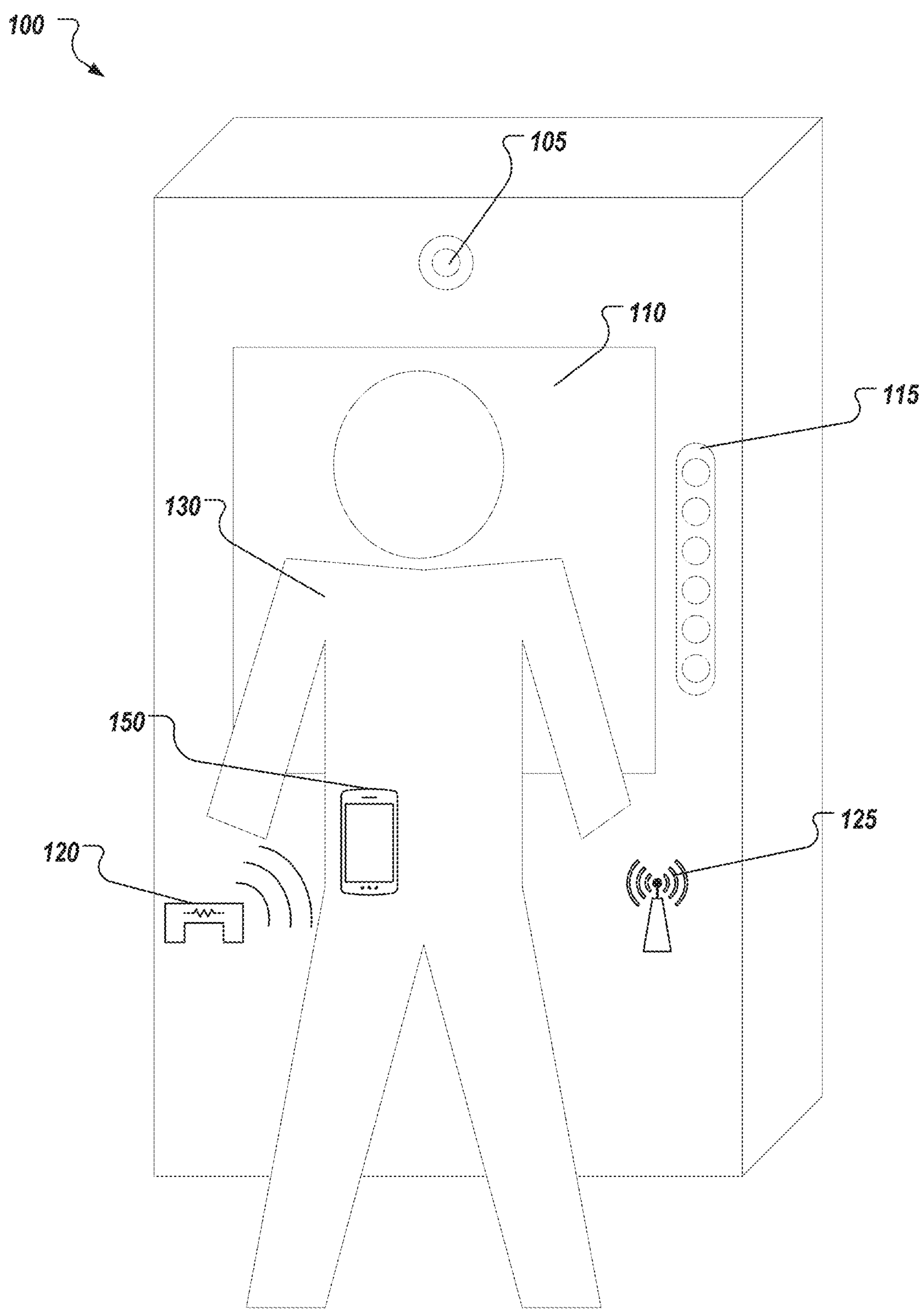
FIG. 1A shows a kiosk machine as an example environment in which the technology described herein may be used.

Repeat use of reference characters in the present specification and drawings is intended to represent same or analogous features or elements.

DETAILED DESCRIPTION

This document presents an authentication method in which a transmitter of a biometric authentication system sends, via an encoded magnetic signal to a nearby computing device of a user, identification information to facilitate identification of the user by way of authenticating the device. Various biometric identification/verification systems are based on gathering or capturing information from a user. Such information may include facial images, iris images, fingerprints, retinal scans, pressure signatures, face scans, auditory biometric information (e.g., voice prints) etc., which are then compared to template information previously stored during an enrollment process. For example, a biometric authentication system that uses face identification may require enrolling users to pose for one or more images of their face during an enrollment process. The images captured during the enrollment process may be stored on a storage device accessible to the biometric authentication system. During run-time, a facial image of a user can be captured and compared with previously-stored template images of multiple users to find a matching picture and determine if the user may be authenticated. The memory or storage devices of biometric authentication systems often store very large gallery sizes, storing hundreds, thousands, tens of thousands, millions, or even more templates of different users. To authenticate a user, the biometric authentication system often compares a run-time image or template of a user with several if not all of the stored images or templates to find a matching identity. Such gallery sizes or search spaces require a significant number of comparisons between probe and gallery templates leading to lower accuracy (finding the correct user out of a very large gallery is much harder or impossible given the higher likelihood of biometric doppelgangers) and can be very slow and energy-inefficient given the required computational resources. Probe template is described herein as an identified/verified subject, and gallery templates as a browsing dataset, where the probe template is searched or matched.

The technology described herein reduces the identification search space or gallery size, allowing a biometric authentication system to identify a user more quickly by way of discovering his or her device. For example, when a user attempts to access a secured device (e.g., a kiosk device), the secured device transmits a magnetic signal (e.g., a frequency encoded bit string) using an electromagnet or similar device, wherein the magnetic signal is encoded with an identifier of the secured device. The magnetic signal can be transmitted, for example, by changing the magnetization of a magnetic material (e.g., by changing one or more parameters of a current flowing through a conductor around a ferromagnetic material core), which in turn changes one or more parameters (e.g., a direction and/or strength) of the corresponding magnetic field. A mobile device a smartphone or a smartwatch in magnetic communication with the secured device (e.g. the kiosk) detects the signal from the secured device using a magnetic sensor (e.g., a magnetometer configured to detect the changes when placed in the magnetic field), and sends, in some cases without user intervention the identifier of the secured device to a remote back-end system implemented, for example, on a server. In some implementations, the mobile device can be communicatively coupled to an external magnetic sensor (e.g., coupled to a box with a magnetic sensor) that is in magnetic communication with the secured device. In response, the server sends identification information (e.g., previously enrolled biometric template) pertaining to a user associated with the corresponding mobile device back to the secured device. The secured device can be configured to independently obtain information about the user (e.g., by capturing an image of the user using a camera on a kiosk device), compare the independently obtained information with the identification information received from the server, and verify that the user attempting to access the secured device is the same user who is associated with the mobile device. Such an identification or verification system may significantly reduce the amount of data that the secured device has to process to authenticate users because the search gallery size for the server is significantly reduced as a result.

In some implementations, the transmitted magnetic signal (such as a chirp or Barker sequence) is used for advertising the presence of the magnetic transmitter to wake up a secondary function, and thus may not have an actual data payload. Such a lighthouse signal could be a preamble for timing purposes and/or for waking up a more power-hungry process that is capable of processing the ensuing payload. In some implementations, this secondary process is an (asymmetric) data return path for the receiving device. For instance, after receiving the magnetic beacon signal, a phone will send out its identifying sequence via a sequence of high frequency chirps (e.g. an FSK encoded notification sound at the highest frequencies it can produce via its speakers, e.g. 15-20 kHz) to the magnetic transmitting station for a kiosk so that the station knows which phone is in front of it, and then for instance it would request the biometric template of the user associated with that phone from the server for the subsequent identification/verification at that kiosk.

In the example of a kiosk device, the device can have one or more electromagnets or transmitting coils positioned close to where the user stands to interact with the kiosk device. Such an arrangement can include a near field magnetic induction (NFMI) transmitter module for user identification. Such NFMI transmitter can be activated using a proximity signal from a sensor (e.g., a proximity sensor) connected to the kiosk device such that the NFMI transmitter is triggered only when a user (along with his or her device) is within range to receive a magnetic signal encoded with the identifier of the kiosk device. These proximity sensors can include simple IR or ultrasonic proximity sensors, vision based proximity sensors, or pressure-sensing ground plates. In some implementations, the NFMI transmitter may have multiple coil systems for different zones and activate its coils only in the zone(s) where user presence is detected by the aforementioned proximity sensors, or the coil polarities or array configuration is adjusted based on the location of the user with respect to the NFMI base station. Such system may improve the user experience by increasing the speed and accuracy of authentication and can also add a security layer to additional biometric authentication methods by including a second factor (user's trusted device) in the authentication loop. In some implementations, the transmitter module can include an array of magnets such as a Halbach array that transmits magnetic signals with the identifier of the kiosk device.

FIG. 1A shows a kiosk machine 100 as an example environment in which the technology described herein may be used. Such kiosk machines may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for said order (or a product at any retail outlet). The kiosk 100 may also be deployed at an entry point (e.g., at the gate of a store, an arena, or a stadium) to authenticate entrants prior to entering the venue. In general, the kiosk 100 may be deployed at various types of locations to authenticate users interactively, or even without any active participation of the user. Additionally, as described in more detail below with respect to FIG. 1B, the technology described herein may be deployed on a different environment that uses biometric authentication, such as rental bicycles or scooters, car doors, or house doors.

The kiosk 100 includes one or more components that support a biometric authentication system. For example, the kiosk 100 can include an illumination source 115 and a camera 105 that captures images of users interacting with the kiosk 100. The illumination source 115 can illuminate the user when the camera captures an image of the user to allow the camera to capture high-quality images. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify a pre-stored profile for the user, and the payment for the food may then be automatically deducted from an account linked to the profile.

In some implementations, the images captured using the camera 105 can be processed using an underlying biometric authentication system to identify/authenticate the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

Figure 1B:
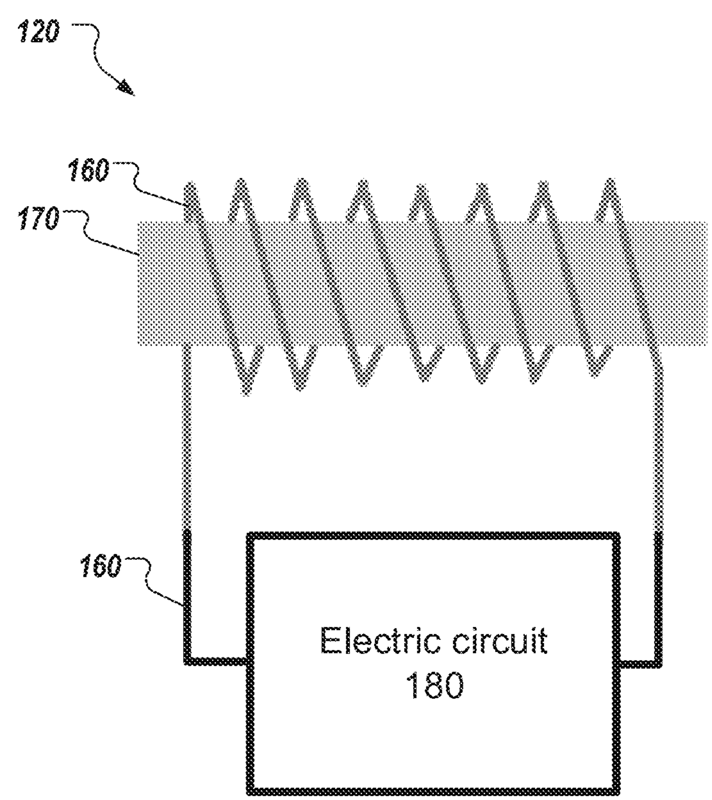
FIG. 1B shows a schematic view of a transmitter module.

Referring to FIGS. 1A and 1B, the kiosk 100 includes a transmitter module 120 such as an electromagnet. The transmitter module 120 transmits the kiosk identifier to the mobile device 150 of a user 130 standing in front of the kiosk. FIG. 1B shows an example of an electromagnet that includes a conductor 160 (e.g., a magnetic coil) wound around a magnetic core 170. The conductor 160 is electrically coupled to an electric circuit 180 that includes a power source. The electric circuit 180 controls the electric current sent through the conductor to control the magnetic field of the electromagnet. For example, the magnetic field is generated by changing one or more parameters of a current (e.g., increasing and decreasing the current or changing the direction of the current) flowing through the conductor 160 around the magnetic core 170 disposed at the second computing device (e.g., kiosk). The electric circuit 180 can facilitate wireless transmission of the encoded data (e.g., a kiosk identifier) using a current that changes one or more parameters (e.g., strength and direction) of a corresponding magnetic field as the current passes through the wound coil 160. The strength of the magnetic field can be measured as a magnetic flux density. In some implementations, the electromagnet can be part of an NFMI communication system in which the electromagnet is configured to generate a magnetic field that includes an NFMI signal.

In some implementations, there are three magnetic coils 160 in the transmitter module, along perpendicular axes, to encode the data points in a 3 dimensional vector space to improve data transmission quality and rate. To calibrate the receiver's orientation with that of this three dimensional NFMI transmitter to correctly decipher the transmitted data points in three dimensional magnetic coordinate system, the transmitter (e.g. kiosk) will send a predetermined handshake signal declaring its x, y, and z axes directions in certain order (e.g. sending a maximally correlational code such as a Barker sequence alongside x, then, y, and finally z direction), and then the receiver (e.g., the mobile device 150) will calibrate its orientation and find the spatial rotation matrix between transmitter and receiver given the received sequence and comparing it to the expected transmitted sequence. In other words, to increase the effectiveness of the mobile device 150 in picking up the signal, the mobile device 150 can consider and use the most likely orientation of the sensor axis with respect to the magnetic signal that is most likely to receive a strong signal for decoding the magnetic signal. For example, an energy of target frequencies along with the expected duration of the signal can be used to judge which sensor axes to include in the decoding process. In some implementations, incoherent detection or short-term Fourier transform is used to detect the frequency-coded information or symbols (FSK or m-FSK). Other frequency detection processes, such as ones employing a Goertzel algorithm, can also be used. In some implementations, the magnetic signal information is encoded into the onsets of maximally correlated codes such as Barker sequences or chirps. In some implementations, the transmitter can send FSK signals to the mobile device at a frequency up to half of the magnetometer sensors' sampling rate (typically 100 Hz) at speeds of up to 20 bits per second. In some implementations, the modem is based on a phase shift keying methods (PSK). In some implementations, the PSK modem uses a 12.5 Hz (or 6.25 Hz for slower sensors) base frequency and the phase shifts are 180 degrees (BPSK).

As shown in FIG. 1A, the user 130 has a mobile device 150 such as a smartphone. The mobile device includes any computing device that can be carried or worn by user 130, such as a smartphone, tablets, a Personal Digital Assistant (PDAs), a smartwatch, and so forth. The mobile device 150 can have decoding software configured to decode the change to the one or more parameters of the magnetic field. For example, the mobile device 150 may be programmed (e.g., through an installed application) to detect, decode, and send the magnetic signal (or its decoded information) transmitted via the transmitter 120. For example, mobile device 150 can be a smartphone that has a receiver (not shown) for receiving the magnetic signal. The receiver of the mobile device 150 detects the parameter changes of the magnetic field or the magnetic oscillations produced by the electromagnet (FIG. 1B). In some implementations, detecting the changes to the parameters includes detecting a frequency at which the one or more parameters change. Such receiver can include one or more magnetic sensors such as a magnetometer, a hall effect sensor, or a compass and decoding software that, in combination with the sensors, receives the magnetic signal and decodes the signal or detects the onset/preamble and transmits the ensuing signal to a server or a third device for final processing and decoding. As further discussed in detail with respect to FIG. 2, the mobile device 150 sends a mobile device identifier and the information received from the magnetic signal to a server that then, based on the receive information, sends template information to the kiosk device 100 that is used in a biometric authentication process, or any other action that might be necessary based on detection of the presence of user's device (e.g., trusted device) in the vicinity of the transmitting kiosk.

In some implementations, mobile device 150 has a low-frequency receiver with a sampling rate of up to 100 Hz, usually in form of multi-axes magnetic sensor. In some implementations, aliasing can be used when decoding a higher frequency chip with a low-sampling rate receiver. For example, magnetic signals with higher-than-sampling rate frequencies (e.g., frequencies modulated using frequency-shift keying [FSK]), such as 140 Hz can be equivalent to 40 Hz at the receiver side at 100 Hz sampling. The bit rate may be increased by using multi frequency-shift keying (m-FSK) modulation where m>2, e.g., by assigning 00 to 35, 01 to 40, 10 to 45, and 11 to 50 Hz, besides shortening symbol duration. Typical symbol duration is 100-200 ms providing up to 20 bits/sec using the above-mentioned values. In some implementations, higher frequency magnetic waves may be used for data transmission by taking advantage of aliasing. In this implementation, one can increase the transmission signal frequency by an integer multiple of the sampling frequency. For instance, if the magnetic sensor's sampling frequency is 100 Hz and the original 0/1 FSK symbol frequencies were set at 35 and 45 Hz respectively, one can use new aliased transmitter frequencies of 135/145 Hz or 235/245 Hz with the same effective (aliased) readout of 35/45 Hz on the receiver side. In some implementations, a preamble magnetic signal can be transmitted using the same or different frequency bands via a magnetic transmitter to indicate the start of the transmission and synchronization for a data pulse train. In some implementations the preamble signal is an exponential square-wave chirp. In some implementations, the FSK or PSK modulation can be paired with temporal coding (e.g. preamble-to-preamble and/or preamble-to-postamble coded delay, as well as onset timestamp information).

In some implementations, mobile device 150 has pre-processing software configured to clarify or correct the signal received. Signal pre-processing software is configured to remove the "noise" received by the device due to environmental, operational, or other instabilities. Some number of externalities can induce "noise" in the received signal. For example, the interaction between device motion and the earth's magnetic field can induce an errant magnetic signal that is received by the mobile device. If not removed, these errant signals can, in some cases, adversely impact the accuracy of the true signal. In some implementations, pre-processing can be done to detect and remove/reduce these errant signals. In the case of motion induced magnetic signal error, the preprocessing can include using the accelerometer and/or gyroscope to sense device motion, calculate the expected magnitude of the motion induced signal (e.g., predict the expected motion induced magnetism in the next time step), and remove the expected magnitude or predicted value from the total received signal. In some cases, the remainder is closer to the "pure" or true signal originally transmitted from the transmitter. Because the total signal received by the mobile device can include the true signal with magnetic signal errors (e.g., motion induced magnetism), removing the errors as described herein can help obtain a better estimate of the original signal transmitted from the transmitter.

The kiosk device 100 may include a processing computer (not shown) communicatively coupled with the transmitter 120. The processing computer may encode the kiosk identifier in a binary code. For example, the kiosk identifier may be encoded via FSK or m-FSK modulation. The computer may then send a data stream with the binary code to the transmitter 120. The transmitter 120, upon receiving the binary code, converts such code into magnetic changes that have a frequency associated with the binary code. For example, the transmitter may produce a different frequency for each bit of a binary code.

In some implementations, in order to improve accuracy or user experience (or both), one can use the time stamps of the transmitted signals for transmitter station identification or disambiguation. Since the transmitting stations and the receiving devices are both in communication with the service provider's servers, the server can use the time stamps of the transmitted signal(s) from broadcasting station(s) (where the user triggered the proximity sensor and initiated the magnetic wave transmission) to match them with those received by user device(s) with closest time stamp(s) or other temporal signatures such as pulse intervals, duration, and matching templates. In some implementations, this information is auxiliary and used for disambiguation (increasing signal entropy) in conjunction with other codes such as Frequency-shift keying (FSK). For example, one or more modulation techniques can be used to encode the binary data. Such modulation techniques include FSK, Phase-shift keying (PSK), Amplitude-shift keying (ASK), or other resilient codes, and perhaps with error detection and maybe error correction. In some implementations, all the information is encoded temporally using indicators such as onset, duration, and intervals of transmitted signal bursts. In such cases, one may use signal compression techniques such as chirps, Barker codes, and pseudo-random sequences to create burst signals with higher signal to noise ratio and temporal resolution for temporal signature encoding, while keeping the burst duration short enough for better user experience.

As shown in FIG. 1A, the kiosk device 100 can additionally include a transceiver 125 such as a Bluetooth beacon. The transceiver 125 may, in addition to the transmitter 120, communicate wirelessly with the electronic device 150 to send the kiosk identifier or other information. Transceiver 125 may be used to 'awaken' the mobile device 150. For example, the decoding routine software (e.g., a pre-installed mobile application) may be awakened by the Bluetooth beacon 125 or another location-based service so that the decoder of the mobile device can be triggered only when the user 130 is in front of or facing the kiosk device 100. Such feature can improve the security of the system, decrease power consumption of the mobile device and the kiosk device, and decrease false positives. Additionally, Bluetooth beacon 125 or similar can increase the reliability of the biometric authentication system described herein. For example, even if the mobile device 150 doesn't correctly decode or partially decodes the magnetic signal, the server or kiosk device 100 can combine the mobile device identification information with the biometric capabilities of the Bluetooth beacon 125 (or similar) to identify the user 130.

Though the present example depicts a kiosk device, the system implemented herein can be used in other environments such as in a house door, a car door, a rental bicycle or scooter, and other related environments; including replacing QR codes and similar in places where users' mobile device is used to scan and receive such visible and unprotected information. In some instances, the system described herein can be used to exchange private keys from phone to shared bikes or vehicles, computer touchpads, doors, smart homes, and to and from other people.

Figure 2:
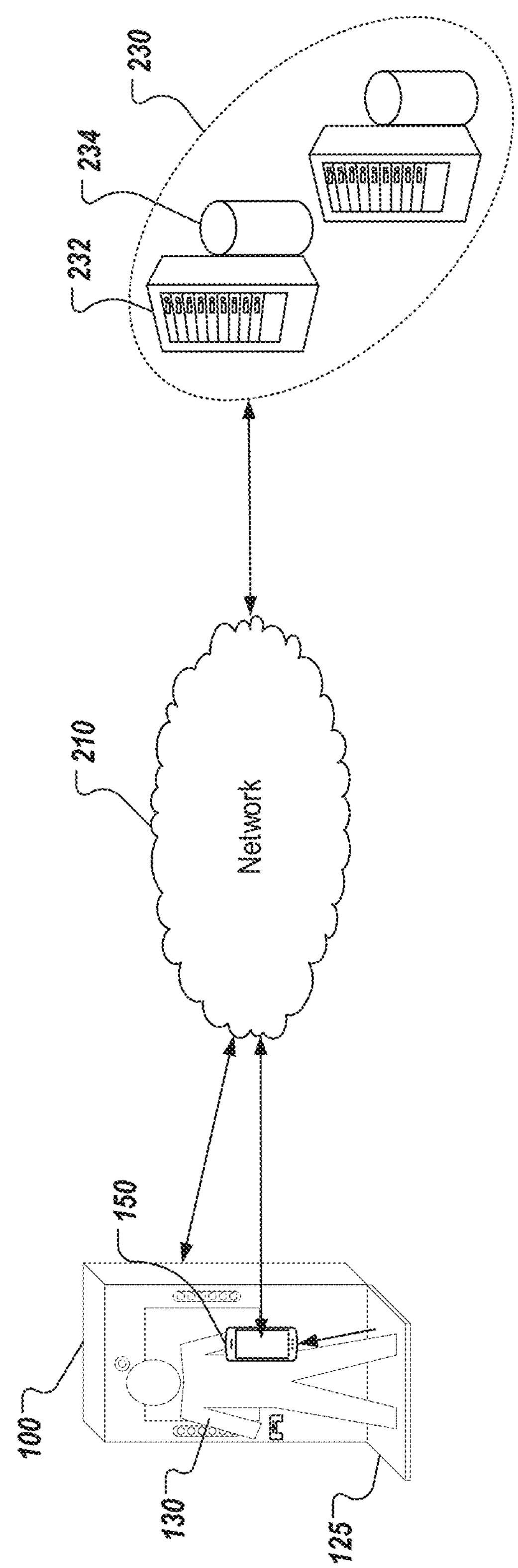
FIG. 2 depicts an example architecture in accordance with implementations of the present disclosure.

Referring to FIG. 2, a biometric authentication system leverages a mobile computing device 150, transmitters, sensors, and communication channels such as data networks to reduce the computing search space, and quickly authenticating a user. For example, a user 130 standing in front of the kiosk 100 may be authenticated without the need of active participation by the user. In this example, a back-end system such as a server system 230 includes one or more processing devices 232 and memories 234 that store information associated with user 130, such as facial images captured during an enrollment process. The mobile device 150 may be programmed (e.g., through an installed application) to detect, decode, and send the information received as a magnetic signal transmitted from the kiosk 100. The information encoded in the magnetic signal may include a kiosk identifier. Upon receiving and decoding the magnetic signal, mobile device 150 sends, through a network 210, the kiosk identifier and a mobile device identifier (e.g., a phone number associated with the mobile device or an application identifier) to server 230. The memory 234 or storage device of server 230 contains an image gallery of users previously enrolled. Using the mobile device identifier, the server finds the template image or images associated with the mobile device identifier and sends that image, through the network 210, to the kiosk device 100 associated with the kiosk identifier. Upon receiving the template image from the server 230, the kiosk device 100 compares an image of the user taken during run-time with the template image to perform one-to-one authentication, instead of 1:N authentication.

In some implementations, the personal device based NFMI is used to partially reduce the search radius for the receiver identification and not necessarily to establish a one to one match. In such cases, a second factor—for example, a biometric identifier such as a face recognition system—can be used to ascertain the identity of the user from that smaller pool. Sometimes this identification of a subset of devices (rather than locating the individual device) is by design (e.g. to improve the user experience by shortening the transmitted signal at the expense of its specificity and entropy), or as a fallback when part of the transmitted signal cannot be resolved due to noise or other errors.

FIG. 3 is a flowchart of an example process for authenticating a user. In some implementations, at least a portion of the process 300 may be executed by one or more processing devices disposed within one or more servers such as the server 230 described with reference to FIG. 2. Operations of the process 300 includes receiving, at one or more servers from a first computing device, (i) first identification information identifying the first computing device or an application executing on the first computing device, and (ii) second identification information identifying a second computing device, wherein the second identification information is obtained by the first computing device by detecting changes to one or more parameters of a magnetic field generated by the second computing device (305). The second computing device may include a kiosk device and the first computing device may include a mobile computing device. The second identification information may include a kiosk identifier and the first identification information may include a phone number or application identifier of the mobile computing device. The one or more parameters of the magnetic field can include a strength of the magnetic field and a direction of the magnetic field. The mobile computing device is considered to be in physical vicinity of the user (e.g. carried in pockets, a purse, or bag) to detect the kiosk-transmitted magnetic signal. The mobile computing device has a receiver that may include a sensor configured to detect the magnetic signal and may additionally include decoding software configured to decode the magnetic signal.

Operations of the process 300 further includes determining, by the server based on the first information, identity information of a user associated with the first computing device (310), and transmitting, from the one or more servers to the second computing device, the identity information, such that the identity information is usable by the second computing device to verify an access attempt by the user (315).

FIG. 4 is a flowchart of an example process for authenticating or verifying a user at a kiosk device. In some implementations, at least a portion of the process 400 may be executed by one or more kiosk devices such as the kiosk device 100 described with reference to FIGS. 1A and 1B. Operations of the process 400 include capturing, using one or more sensors of the kiosk device, first information about a user attempting to access the kiosk device (402). The one or more sensors may include an image sensor of a camera, and capturing the first information about the user may include capturing an image of the user standing in front of the kiosk device. The process 400 further includes changing, by the kiosk device, one or more parameters of a magnetic field generated by the kiosk device to encode identification information of the kiosk device (404). Changing the one or more parameters can include using an electromagnet of the kiosk device to create a magnetic field and change parameters of the magnetic field. The process 400 may, in addition, contain a proximity sensing mechanism, such as floor-embedded pressure sensors or other proximity sensors such as capacitive, infrared, ultrasonic, image based, or time of flight proximity sensors to initiate the magnetic signal transmission only when the user is properly standing in front of the kiosk.

Operations of the process 400 further includes receiving, from one or more servers by the kiosk device, second information identifying a user of a mobile device that detects the changes in the one or more parameters of the magnetic field (406). The second information from the one or more servers may include an image or biometric template of the user captured and stored during an enrollment process. The process 400 also includes verifying, by the kiosk device based on the first information and the second information, that the user attempting to access the kiosk device is the user of the mobile device (408), and responsive to verifying that the user attempting to access the kiosk device is the user of the mobile device, granting the user access to the kiosk device (410).

Figure 5:
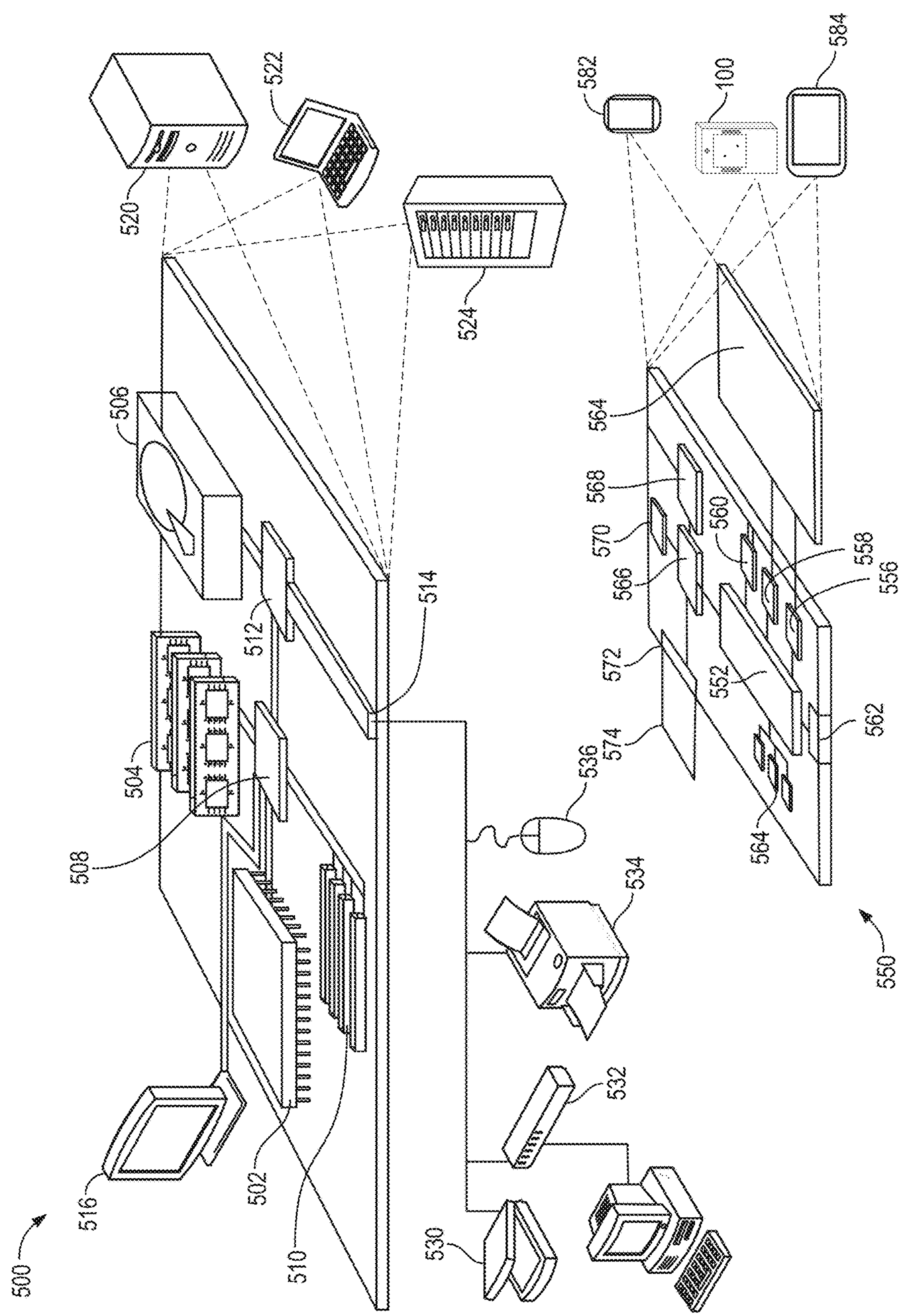
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back-end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. One or more non-transitory computer-readable storage devices coupled to one or more processors and having instructions stored thereon which, when executed by the one or more processors, cause the one or more processors to perform operations comprising:

receiving, at one or more servers from a first computing device, (i) first identification information identifying the first computing device or an application executing on the first computing device, and (ii) second identification information identifying a second computing device, wherein the second identification information is obtained by the first computing device by detecting changes to one or more parameters of a magnetic field generated by the second computing device, wherein the first identification information comprises a phone number of the first computing device, and the second identification information comprises a kiosk identifier;

determining, by the one or more servers based on the first identification information, identity information of a user associated with the first computing device; and transmitting, from the one or more servers to the second computing device, the identity information of the user, such that the identity information of the user is usable, with biometric information of the user collected by the second computing device, to verify, by the second computing device, an access attempt by the user.

2. The one or more non-transitory computer-readable storage devices of claim 1, wherein the one or more parameters of the magnetic field comprise at least one of a strength of the magnetic field and a direction of the magnetic field.

3. The one or more non-transitory computer-readable storage devices of claim 2, wherein the strength of the magnetic field is measured as a magnetic flux density.

4. The one or more non-transitory computer-readable storage devices of claim 1, wherein detecting the changes to the one or more parameters comprises detecting a frequency at which the one or more parameters change.

5. The one or more non-transitory computer-readable storage devices of claim 1, wherein the magnetic field is generated by changing one or more parameters of a current flowing through a conductor around a magnetic core disposed at the second computing device.

6. The one or more non-transitory computer-readable storage devices of claim 1, wherein the first computing device comprises a mobile computing device.

7. The one or more non-transitory computer-readable storage devices of claim 6, wherein the mobile computing device comprises a receiver comprising a magnetic sensor configured to detect the changes to the one or more parameters and decoding software configured to decode the changes to the one or more parameters.

8. The one or more non-transitory computer-readable storage devices of claim 7, wherein the magnetic sensor comprises a magnetometer.

9. The one or more non-transitory computer-readable storage devices of claim 1, wherein the changes to the one or more parameters of the magnetic field comprises a magnetic signal comprising binary data encoded using a modulation technique, the binary data comprising the second identification information.

10. The one or more non-transitory computer-readable storage devices of claim 9, wherein the modulation technique comprises one or more of a Frequency-shift keying (FSK) modulation, a Phase-shift keying (PSK) modulation, and an Amplitude-shift keying (ASK) modulation.

11. The one or more non-transitory computer-readable storage devices of claim 9, wherein the binary data is temporally encoded using indicators of transmitted signal bursts, the signal bursts generated using a signal compression method.

12. A system comprising:

one or more computers and one or more storage devices storing instructions that are operable, when executed by the one or more computers, to cause the one or more computers to perform operations comprising:

receiving, at one or more servers from a first computing device, (i) first identification information identifying the first computing device or an application executing on the first computing device, and (ii) second identification information identifying a second computing device, wherein the second identification information is obtained by the first computing device by detecting changes to one or more parameters of a magnetic field generated by the second computing device, wherein the first identification information comprises a phone number of the first computing device, and the second identification information comprises a kiosk identifier;

determining, by the one or more servers based on the first identification information, identity information of a user associated with the first computing device; and transmitting, from the one or more servers to the second computing device, the identity information of the user, such that the identity information of the user is usable, with biometric information of the user collected by the second computing device, to verify, by the second computing device, an access attempt by the user.

13. The system of claim 12, wherein the one or more parameters of the magnetic field comprise at least one of a strength of the magnetic field and a direction of the magnetic field.

14. The system of claim 13, wherein the strength of the magnetic field is measured as a magnetic flux density.

15. The system of claim 12, wherein detecting the changes to the one or more parameters comprises detecting a frequency at which the one or more parameters change.

16. The system of claim 12, wherein the magnetic field is generated by changing one or more parameters of a current flowing through a conductor around a magnetic core disposed at the second computing device.

17. The system of claim 12, wherein the first computing device comprises a mobile computing device.

18. The system of claim 17, wherein the mobile computing device comprises a receiver comprising a magnetic sensor configured to detect the changes to the one or more parameters and decoding software configured to decode the changes to the one or more parameters.

19. The system of claim 18, wherein the magnetic sensor comprises a magnetometer.

20. The system of claim 12, wherein the changes to the one or more parameters of the magnetic field comprises a magnetic signal comprising binary data encoded using a modulation technique, the binary data comprising the second identification information.

21. The system of claim 20, wherein the modulation technique comprises one or more of a Frequency-shift keying (FSK) modulation, a Phase-shift keying (PSK) modulation, and an Amplitude-shift keying (ASK) modulation.

22. The system of claim 20, wherein the binary data is temporally encoded using indicators of transmitted signal bursts, the signal bursts generated using a signal compression method.

* * * * *